May 2, 1961  L. I. KAPLAN  2,982,846
LAMINATED STRUCTURE AND METHOD OF FABRICATING THE SAME
Filed Aug. 5, 1958  2 Sheets-Sheet 1
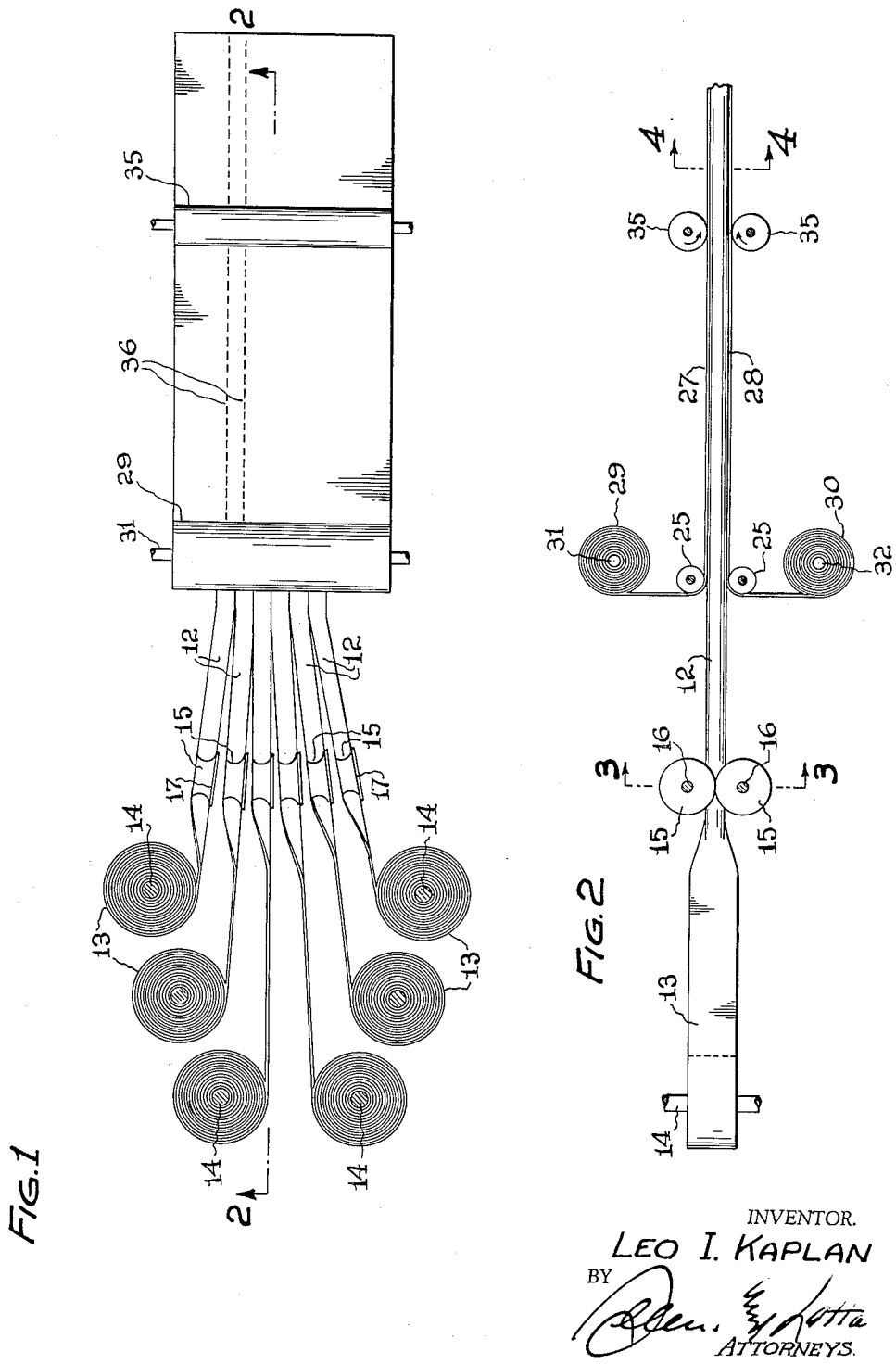
INVENTOR.
LEO I. KAPLAN
BY
ATTORNEYS.

May 2, 1961 L. I. KAPLAN 2,982,846
LAMINATED STRUCTURE AND METHOD OF FABRICATING THE SAME
Filed Aug. 5, 1958 2 Sheets-Sheet 2

INVENTOR.
LEO I. KAPLAN
BY
ATTORNEYS.

United States Patent Office 2,982,846
Patented May 2, 1961

2,982,846

LAMINATED STRUCTURE AND METHOD OF FABRICATING THE SAME

Leo I. Kaplan, Sunland, Calif., assignor to Poly Industries, Inc., a corporation of California Filed Aug. 5, 1958, Ser. No. 753,377

10 Claims. (Cl. 219—117)

This invention relates to lightweight high-strength laminated structures and more particularly to an improved continuous structure of this type and to a method of fabricating the same from rolls of flat strip material.

Laminated sandwich structures have been proposed heretofore formed from a unitary reinforcing core sheet sandwiched between flat exterior face sheets riveted or bonded in some manner to the core sheet. Such structures and the techniques involved in fabricating the same present many difficulties including the formation of the core sheet in a manner to obtain the desired maximum strength therefrom as well as in such manner that the resulting sandwich structure is uniformly flat and of uniform thickness throughout its width. The present invention provides a sandwich structure and a fabricating method obviating the disadvantages and shortcomings of prior structures. More specifically the invention contemplates the formation of the reinforcing from a plurality of individual thin narrow strips formed into a suitable cross-sectional shape of high-strength by separate and independent forming dies each of which can be separately adjusted to provide a plurality of identical reinforcing strips continuously and at a uniform rate synchronized with the other coordinated steps of the invention. A further feature of the present invention is the continuous forming and advancement of the identical reinforcing strips from the forming station to a welding station at which flat face sheets are pressed against the core strips from the opposite sides thereof as a welding current is passed through the structure along lines directly opposite the individual reinforcing or core strips to provide a finished product characterized by a pair of flat face sheets of continuous length held uniformly spaced by a plurality of closely nested parallel reinforcing strips. The individual reinforcing strips may be formed in a variety of ways and cross-sectional shapes depending upon the characteristics desired in the finished sandwich product.

Accordingly, a primary object of the present invention is the provision of an improved high strength lightweight sandwich structure and a method of fabricating the same in continuous lengths.

Another object of the invention is the provision of a continuous laminated sandwich structure comprising outer face sheets rigidly secured to the opposite lateral edges of a plurality of separate intervening reinforcing strips.

Another object of the invention is the provision of an improved method of fabricating a continuous laminated sandwich structure from a plurality of flat strips of metal continuously shaped into reinforcing spacer or core strips and for feeding these strips between a pair of wide flat metal face strips under a suitable welding pressure while passing a welding current through the structure to secure the components thereof rigidly together.

Another object of the invention is the provision of an improved high strength laminated sandwich structure wherein the several components are rigidly secured together as the same are fed forwardly at a substantially uniform rate while passing welding current therethrough from the opposite exterior faces of the structure while utilizing the strength of the structure components to counter the welding pressure.

These and other more specific objects will appear upon reading the following specification and claims and upon considering in connection therewith the attached drawings to which they relate.

Referring now to the drawings in which a preferred embodiment of the invention is illustrated:

Figure 1 is a diagrammatic view illustrating one preferred method of continuously forming the core strips and feeding the same between a pair of flat facing strips as welding current is passed between the face sheets to weld the structure together;

Figure 2 is a sectional view taken along line 2—2 on Figure 1;

Figure 3:
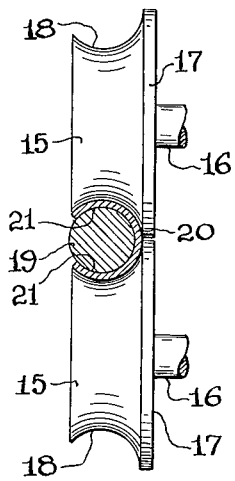
Figure 3 is a transverse sectional view taken along line 3—3 on Figure 2.
Figure 4:
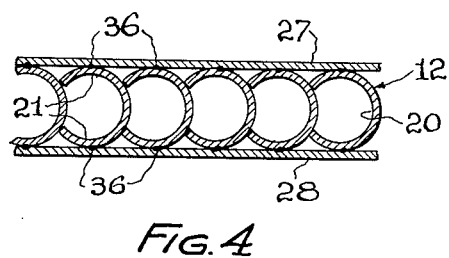
Figure 4 is a fragmentary transverse sectional view on an enlarged scale taken along line 4—4 on Figure 2.

Referring to Figures 1 to 4, there is shown one suitable arrangement for fabricating laminated sandwich structures incorporating the features of the present invention. The sandwich structure there shown includes a plurality of reinforcing core strips 12 of identical C-shape in cross-section. These core strips are formed from thin narrow strips of any suitable metal, as for example, stainless steel, fed from large coils 13 thereof individually supported on vertically arranged spindles 14, these spindles preferably being appropriately spaced in the manner indicated and feeding to individual pairs of forming rollers 15, 15 suitably supported on individual shafts 16, 16.

Each forming roller 15 includes a flange 17 in radial alignment with the corresponding flange 17 of a mating roller and having one side wall merging with the grooved peripheral surface 18 of the roller. A circular pilot rod 19 may have its free forward end positioned between grooved surfaces 18, 18 of the rollers and its rear end supported in any suitable manner. As is best shown in Figure 3, pilot rod 19 has a diameter corresponding to or somewhat less than the interior diameter of strips 12, its function being to cooperate with the grooved surfaces in forming the strip material into the desired shape as it is pulled past forming rolls 15, 15.

Although as herein illustrated the cross-sectional shape of core strip 12 is generally circular, it will be understood that web portion 20 of the core strip may be flat or substantially so if desired and likewise that the lip portion 21, 21 integral with the opposite edges of web 20 may be somewhat flatter at their diametrically opposed areas opposite the face sheet thereby providing a broader and a firmer contact with the face sheet.

Preferably the open sides of the C-shaped core strips 12, 12 face in the same direction and toward one lateral edge of the sandwich structure. Accordingly, as these strips are fed to the welding stations opposite the high pressure rollers 25, 25 the open sides of the strips are adapted to nest against the web portion of the adjacent core strip in the manner best illustrated in Figure 4. Pressure rollers 25, 25 extend transversely of the core strips and in closely spaced relation to the opposite edges of the core strips. It will be understood that any suitable adjustable means, not shown, may be employed to press these rollers resiliently toward one another from the opposite sides of the sandwich components under loads adequate to apply the requisite high welding pressure customarily employed in electric welding operations.

The face sheets 27, 28 are supplied from continuous rolls of the sheet metal 29 and 30 suitably supported on shafts 31, 32 in close proximity to pressure rollers 25, 25, the sheet material being passed between rollers 25 and the adjacent upper and lower faces of core strips 12, 12.

It is also pointed out that a high-density low-voltage welding current is connected in known manner to metal rollers 25, 25 to the end that the welding current will pass through the structure from its opposite flat exterior faces to form continuous seam welds between the face sheets and the individual core strips. No internal supporting members are required to counter the welding pressure, the entire load being absorbed by the components being welded under a preferred mode of practicing the invention.

The advancement of the individual components as well as of the finished structure may be provided for in any convenient manner such as by pairs of opposed feed rolls 35, 35 driven in opposite directions and having high frictional contact with the exterior surface of face sheets 27 and 28. Although only one pair of feed rolls 35, 35 is illustrated it is pointed out that several pairs of these may be, and preferably are, provided all synchronized to be driven at the same speed and cooperating to advance the components past the forming station represented by rollers 15 and the welding station represented by rollers 25, 25. The finished product consists of outer flat face sheets of metal 27 and 28 rigidly welded to the intermediate core strips 12 along continuous seams represented by dotted lines 36, 36 in Figure 1.

According to an alternate method of fabricating the sandwich structure, the core strips and the face sheets may be rigidly secured together by brazing. When utilizing this technique the core strips may be coated on the exterior surfaces of lips 21, 21 with a brazing compound prior to the entry of the strips between the face sheets 27, 28. The components of the advancing structure, including the face sheets 27, 28 and core strips 12, are held firmly pressed together by a multiplicity of opposed rollers similar to feed rollers 35, 35 as they are advanced through a high temperature zone or brazing oven maintained at a temperature sufficient to fuse the brazing compound. This assembly is held thus firmly compressed from its opposite sides while being cooled and while the brazing compound takes a set. The brazing procedure has the advantage that the brazing compound flows between the juxtaposed edges of the lips 21 and web 20 of the adjacent strip thereby fusing the strips together to provide an exceedingly unitary core structure between the facing sheets.

Figure 6:
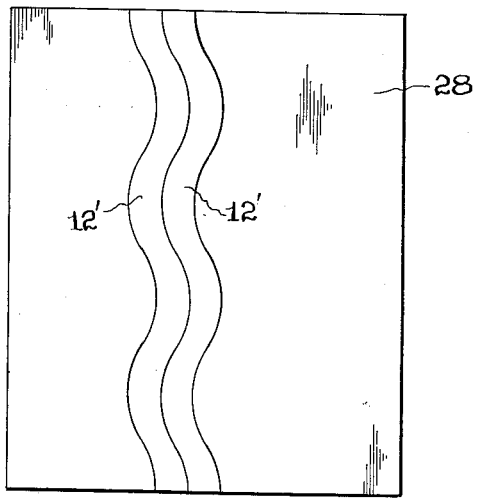
Figure 6 is a fragmentary plan view of still another embodiment showing a pair only of core strips corrugated lengthwise thereof and assembled in side-by-side relation against the inner side of the lower face sheet.

It is also pointed out that additional strength can be achieved by corrugating the core strips lengthwise thereof after they pass forming rolls 15, 15 and before entering between the welding rollers 25, 25, or into the brazing oven. The shape of one pair of corrugated C-shaped strips 12', 12' lying in nested relation against the lower facing sheet 28 is illustrated in Figure 6. As is there apparent, the lengthwise corrugations are relatively shallow and the crests of adjacent corrugations are relatively widely spaced lengthwise of the strips.

Figure 5:
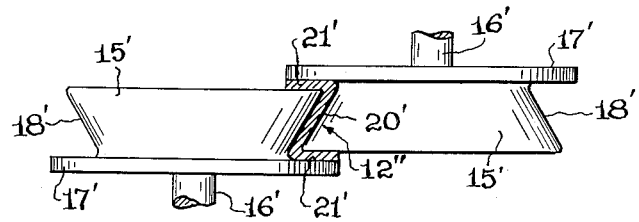
Figure 5 is a view similar to Figure 3 showing an alternate forming roll construction for shaping another preferred core strip.

As an example of another suitable shape of reinforcing core strips, there is shown in Figure 5 a single core strip of Z-shape in cross-section. The rollers 15' employed in shaping this strip from flat strip material 13 have the configuration shown in Figure 5, the flanges 17' being disposed on the opposite sides of the rollers from one another and cooperating with the deeply grooved periphery 18' of the roller to form the straight web portion 20' of the core strip and the oppositely directed lip portions 21', 21'. While not illustrated, it will be understood that the opposite edges of lips 21' of adjacent strips are preferably assembled in close abutting relationship relative to one another between face sheets 27, 28 prior to the welding or brazing operation. It is likewise pointed out that core strips 12" may be corrugated lengthwise thereof in the same manner described in connection with Figure 6.

It is also contemplated that irrespective of the shape of the core strip employed, those strips on the right half of the advancing structure may face in one direction while those on the opposite side or half of the structure may face in the other direction. For example, one-half of the C-shaped core strip 12 will face toward one lateral edge of face sheets 27 and 28 while the open side of the remaining core strips will face in the opposite direction. It will also be understood that the inclined web portions 20' of adjacent core strips shown in Figure 5 may slope in opposite directions with the result that the webs of adjacent strips cooperate in providing V-shaped reinforcing struts between the face sheets and extending longitudinally thereof.

It is emphasized that the described sandwich structure is preferably formed in thicknesses not exceeding one inch, and usually in thicknesses appreciably less than one inch. The core strips may have a thickness of one to ten mils while the face sheets preferably have a thickness two to several times that of the core strips.

While the particular lightweight high-strength sandwich structure and method of fabricating the same herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. That method of fabricating a continuous high-strength lightweight sandwich structure from thin sheet material which method comprises feeding a plurality of independent narrow strips of thin metal under tension past a forming station and there forming said strips into similar core strips each having a central longitudinal web and laterally projecting lips, feeding said core strips past a bonding station with said core strips arranged laterally of one another and said lips lying in horizontally disposed parallel planes, feeding a pair of wide facing sheets of thin metal under pressure against said lips from the opposite sides of said core strips, and passing a welding current through said face sheets and the intervening core strips to weld said structure rigidly together.

2. The method defined in claim 1 characterized in that said core strips are so formed that the lips along the opposite lateral edges of said web project therefrom in opposite directions.

3. The method defined in claim 1 characterized in that said core strips are so formed that the lips along the opposite lateral edges of said web project therefrom in the same direction.

4. The method defined in claim 2 characterized in that said core strip lips are formed to lie in flat planes on the opposite sides of said web, and said web lying at an angle of less than 90 degrees with respect to said lips.

5. The method defined in claim 1 characterized in that said core strips are generally C-shape in cross-section.

6. The method defined in claim 5 wherein the open side of said C-shape core strips face in the same direction and toward one lateral edge of said laminated structure as they are fed to said welding station.

7. The method defined in claim 1 including the step of corrugating said core strips lengthwise thereof before advancing the same past said welding station.

8. That method of fabricating a high-strength lightweight planar sandwich structure which comprises continuously feeding a plurality of narrow continuous core strips under tension and arranged in closely spaced relation laterally of one another past a bonding station, feeding continuous wide flat metal face sheets against the opposite sides of said core strips under high pressure while advancing said face sheets and said core strips in unison, and applying a temperature to said structure sufficient to fuse the contacting areas of said face sheets and core strips together.

9. That method defined in claim 8 characterized in the passage of a high density welding current through said structure from the exterior surfaces of said face sheets and through the intervening core strips to fuse the components together lengthwise of the continuous sandwich structure.

10. That method defined in claim 9 characterized in that the welding pressure applied transversely through said face sheets is countered by the strength of said core strips in cooperation with the face sheets held pressed against the opposed edges thereof.

References Cited in the file of this patent

UNITED STATES PATENTS

| | | |
|---|---|---|
| 1,042,885 | Budd et al. | Oct. 29, 1912 |
| 2,056,563 | Budd et al. | Oct. 6, 1936 |
| 2,299,776 | Weightman | Oct. 27, 1942 |
| 2,720,949 | Pajak | Oct. 18, 1955 |
| 2,746,139 | Pappelendam | May 22, 1956 |
| 2,747,064 | Pappelendam | May 22, 1956 |
| 2,756,496 | Holland | July 31, 1956 |
| 2,796,157 | Ginsburg | June 18, 1957 |
| 2,809,276 | Smith | Oct. 8, 1957 |
| 2,820,882 | Johnson | Jan. 21, 1958 |